(12) United States Patent
Gibson et al.

(10) Patent No.: US 11,226,258 B2
(45) Date of Patent: *Jan. 18, 2022

(54) ADJUSTABLE HYDRANT STRAP

(71) Applicant: Mueller International, LLC, Atlanta, GA (US)

(72) Inventors: Daryl Lee Gibson, Cleveland, TN (US); David James Carlos Dunn, Limehouse (CA)

(73) Assignee: Mueller International, LLC, Atlanta, GA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/733,712

(22) Filed: Jan. 3, 2020

(65) Prior Publication Data

US 2020/0141831 A1 May 7, 2020

Related U.S. Application Data

(63) Continuation of application No. 16/032,758, filed on Jul. 11, 2018, now Pat. No. 10,564,061, which is a
(Continued)

(51) Int. Cl.
*G01M 3/24* (2006.01)
*F16B 1/00* (2006.01)
(Continued)

(52) U.S. Cl.
CPC .............. *G01M 3/243* (2013.01); *F16B 1/00* (2013.01); *F16B 2/08* (2013.01); *F16B 23/0069* (2013.01);
(Continued)

(58) Field of Classification Search
CPC .......... F16B 1/00; F16B 2/08; F16B 23/0069; F16B 41/005; F16L 3/00; F16L 3/14; F16L 2201/30; G01M 3/24; G01M 3/243
See application file for complete search history.

(56) References Cited

U.S. PATENT DOCUMENTS 2,158,802 A   5/1939   Redlon
2,466,247 A   4/1949   Land
(Continued)

FOREIGN PATENT DOCUMENTS

DE   4304239   8/1994
EP   0437211   7/1991
(Continued)

OTHER PUBLICATIONS

Gibson, Daryl Lee; Issue Notification for U.S. Appl. No. 15/056,329, filed Feb. 29, 2016, dated Jul. 25, 2018, 1 pg.
(Continued)

*Primary Examiner* — Nguyen Q. Ha
(74) *Attorney, Agent, or Firm* — Taylor English Duma LLP

(57) ABSTRACT

A monitoring device for a pipe system includes a housing defining a mounting surface and a pair of mounting receptacles on a mounting side, the housing configured to mount on an exterior surface of a pipe element of the pipe system, the housing including a housing body defining a wet compartment intersecting the mounting surface; a tamper-resistant housing fastener configured to resist unfastening without a special removal tool; and a strap assembly including a mounting tab, the strap assembly secured to the housing by receiving the housing fastener through the mounting tab and within a first mounting receptacle of the pair of mounting receptacles.

21 Claims, 10 Drawing Sheets

Related U.S. Application Data continuation of application No. 15/056,329, filed on Feb. 29, 2016, now Pat. No. 10,048,159.

(51) Int. Cl.

| | | |
|---|---|---|
| *F16L 3/00* | (2006.01) | |
| *F16L 3/14* | (2006.01) | |
| *F16B 2/08* | (2006.01) | |
| *F16B 23/00* | (2006.01) | |
| *F16B 41/00* | (2006.01) | |

(52) U.S. Cl.
CPC ......... *F16B 41/005* (2013.01); *F16L 2201/30* (2013.01)

(56) References Cited

U.S. PATENT DOCUMENTS

| | | | |
|---|---|---|---|
| 2,681,197 | A | 6/1954 | Johnson |
| 3,038,230 | A | 6/1962 | Henning |
| 4,044,428 | A | 8/1977 | Kowalski |
| 4,069,433 | A | 1/1978 | McShane |
| 4,299,012 | A | 11/1981 | Oetiker |
| 4,561,459 | A | 12/1985 | Jackman |
| 4,844,396 | A | 7/1989 | Norton |
| 4,855,973 | A | 8/1989 | Crocco |
| 5,627,520 | A | 5/1997 | Grubbs et al. |
| 7,475,602 | B2 | 1/2009 | Molenaar et al. |
| 9,664,589 | B2 | 5/2017 | Horne et al. |
| 9,670,650 | B2 * | 6/2017 | Pinney .................. E03B 9/02 |
| 10,048,159 | B2 | 8/2018 | Gibson et al. |
| 10,564,061 | B2 | 2/2020 | Gibson et al. |
| 2014/0161151 | A1 | 6/2014 | Proctor et al. |
| 2016/0018283 | A1 | 1/2016 | Fleury et al. |
| 2017/0248489 | A1 | 8/2017 | Gibson et al. |
| 2018/0321107 | A1 | 11/2018 | Gibson et al. |

FOREIGN PATENT DOCUMENTS

| | | |
|---|---|---|
| EP | 3426932 | 5/2021 |
| FR | 2833346 | 6/2003 |
| JP | 11230421 | 8/1999 |
| JP | 2009041991 | 2/2009 |
| JP | 2017093114 | 5/2017 |
| WO | 2015118326 | 8/2015 |
| WO | 2017151152 | 9/2017 |

OTHER PUBLICATIONS

Gibson, Daryl Lee; Non-Final Office Action for U.S. Appl. No. 15/056,329, filed Feb. 29, 2016, dated Jan. 11, 2018, 29 pgs.

Gibson, Daryl Lee; Notice of Allowance for U.S. Appl. No. 15/056,329, filed Feb. 29, 2016, dated May 14, 2018, 12 pgs.

Gibson, Daryl Lee; Non-Final Office Action for U.S. Appl. No. 16/032,758, filed Jul. 11, 2018, dated Aug. 14, 2019, 27 pgs.

Gibson, Daryl Lee; Notice of Allowance for U.S. Appl. No. 16/032,758, filed Jul. 11, 2018, dated Oct. 17, 2019, 8 pgs.

Gibson, Daryl Lee; International Preliminary Report on Patentability for PCT Application No. PCT/US16/21687, filed Mar. 10, 2016, dated Sep. 13, 2018, 10 pgs.

Gibson, Daryl Lee; International Search Report and Written Opinion for PCT Application No. PCT/US16/21687, filed Mar. 10, 2016, dated May 17, 2016, 12 pgs.

Gibson, Daryl Lee; Extended European Search Report for serial No. 16892896.8, filed Mar. 10, 2016, dated Dec. 3, 2019, 8 pgs.

Acquarius Spectrum; Article entitled: "Multi-layer leak detection for urban water systems"; located at <http://aquarius-spectrum.com>, accessed on Jan. 20, 2016, 8 pgs.

Mueller Co.; Specification Sheet for Mueller Hydrant Defender Security Device, publicly available prior to Feb. 29, 2016, 1 pg.

* cited by examiner

ADJUSTABLE HYDRANT STRAP

CROSS-REFERENCE TO RELATED APPLICATIONS

This application is a continuation of U.S. patent application Ser. No. 16/032,758, filed on Jul. 11, 2018, which issued into U.S. Pat. No. 10,564,061 on Feb. 18, 2020, which is a continuation of U.S. patent application Ser. No. 15/056,329, filed on Feb. 29, 2016, which issued into U.S. Pat. No. 10,048,159 on Aug. 14, 2018, each of which is hereby specifically and expressly incorporated by reference herein in its entirety.

TECHNICAL FIELD

Field of Use

The present disclosure relates generally to mounting equipment in pipe systems and, in particular, to equipment for mounting sensors in a pipe system.

Related Art

Monitoring the condition of a pipe system or a fluid contained therein sometimes involves the use of a monitoring device. The diameter or shape of the portion of the pipe system to be monitored can vary significantly from one pipe system to another or at different positions within a pipe system. A monitoring device that is not adequately secured to the pipe system or that is removable with common tools or without any tools at all can be at risk for theft, accidental damage, or even sabotage.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a monitoring device for a pipe system, the monitoring device comprising: a housing defining a mounting surface and a pair of mounting receptacles on a mounting side, the housing configured to mount on an exterior surface of a pipe element of the pipe system; a tamper-resistant housing fastener; and a strap assembly, the housing fastener received within each mounting receptacle to secure the strap assembly to the housing, the strap assembly comprising a first strap and a second strap, the first strap comprising a first mounting end, a first adjusting end distally located from the first mounting end, and an intermediate portion therebetween, the first strap comprising a first mounting tab proximate to the first mounting end, the first strap further comprising an insert tab proximate to the first adjusting end, the housing fastener connecting the first mounting tab within a first mounting receptacle of the pair of mounting receptacles; the second strap comprising a second mounting end, a second adjusting end distally located from the second mounting end, and a second intermediate portion therebetween, the second strap comprising a second mounting tab proximate to the second mounting end, the second mounting tab coupled to a second mounting receptacle of the pair of mounting receptacles, the second strap comprising a plurality of adjustment slots proximate to the second adjusting end, each adjustment slot aligned in an axial direction of the strap assembly and sized to lockably receive a portion of the insert tab in any one of a plurality of insert positions, each insert position corresponding to a different inner diameter of the strap assembly when the monitoring device is tightened, a portion of the first strap proximate to the first adjusting end crossing a portion of the second strap proximate to the second adjusting end and a portion of the first strap positioned radially inside the second adjusting end of the second strap, the insert tab lockably coupled to the second strap when the monitoring device is tightened.

In another aspect, disclosed is a monitoring device for a pipe system, the monitoring device comprising a housing, a housing fastener, and a strap assembly. The housing is configured to mount on an exterior surface of a pipe element of the pipe system. The strap assembly is coupled to the housing with the housing fastener, the housing fastener received within the housing to secure the strap assembly to the housing. The strap assembly comprises a first strap and a second strap, the first strap comprising a first mounting end, a first adjusting end distally located from the first mounting end, and a first intermediate portion therebetween, the first strap comprising an insert tab proximate to the first adjusting end; the second strap comprising a second mounting end, a second adjusting end distally located from the second mounting end, and a second intermediate portion therebetween, the second strap comprising a plurality of adjustment slots sized to lockably receive a portion of the insert tab in any one of a plurality of insert positions, the insert tab lockably coupled to the second strap when the monitoring device is tightened.

In a further aspect, disclosed is a method for installing a monitoring device on a pipe system, the monitoring device comprising a strap assembly and a housing, the method comprising: coupling an adjusting end of a first strap of the strap assembly to a second strap of the strap assembly by inserting an insert tab of the first strap into a one of a plurality of adjustment slots defined on the second strap, each of the plurality of adjustment slots sized to lockably receive a portion of the insert tab in any one of a plurality of insert positions; coupling the housing to the strap assembly by installing a housing fastener through the strap assembly and into a mounting receptacle of the housing; and tightening the strap assembly against an exterior surface of a pipe element of the pipe system by tightening the housing fastener.

In a further aspect, disclosed is a monitoring device for a pipe system, the monitoring device comprising: a housing defining a mounting surface and a pair of mounting receptacles on a mounting side, the housing configured to mount on an exterior surface of a pipe element of the pipe system, the housing comprising a housing body defining a wet compartment intersecting the mounting surface; a tamper-resistant housing fastener configured to resist unfastening without a special removal tool; and a strap assembly comprising a mounting tab, the strap assembly secured to the housing by receiving the housing fastener through the mounting tab and within a first mounting receptacle of the pair of mounting receptacles.

In a further aspect, disclosed is a housing assembly for a monitoring device for a pipe system, the assembly comprising: a housing body defining a mounting surface and a pair of mounting receptacles on a mounting side, the housing body configured to mount on an exterior surface of a pipe element of the pipe system, the housing defining a wet compartment intersecting the mounting surface; a housing cover; a cover fastener securing the housing cover to the housing body; and a strap assembly secured to the housing with a tamper-resistant housing fastener, the tamper-resistant housing fastener configured to resist unfastening without a special removal tool.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention. Corresponding features and components throughout the figures may be designated by matching reference characters for the sake of consistency and clarity.

DETAILED DESCRIPTION

Figure 1:
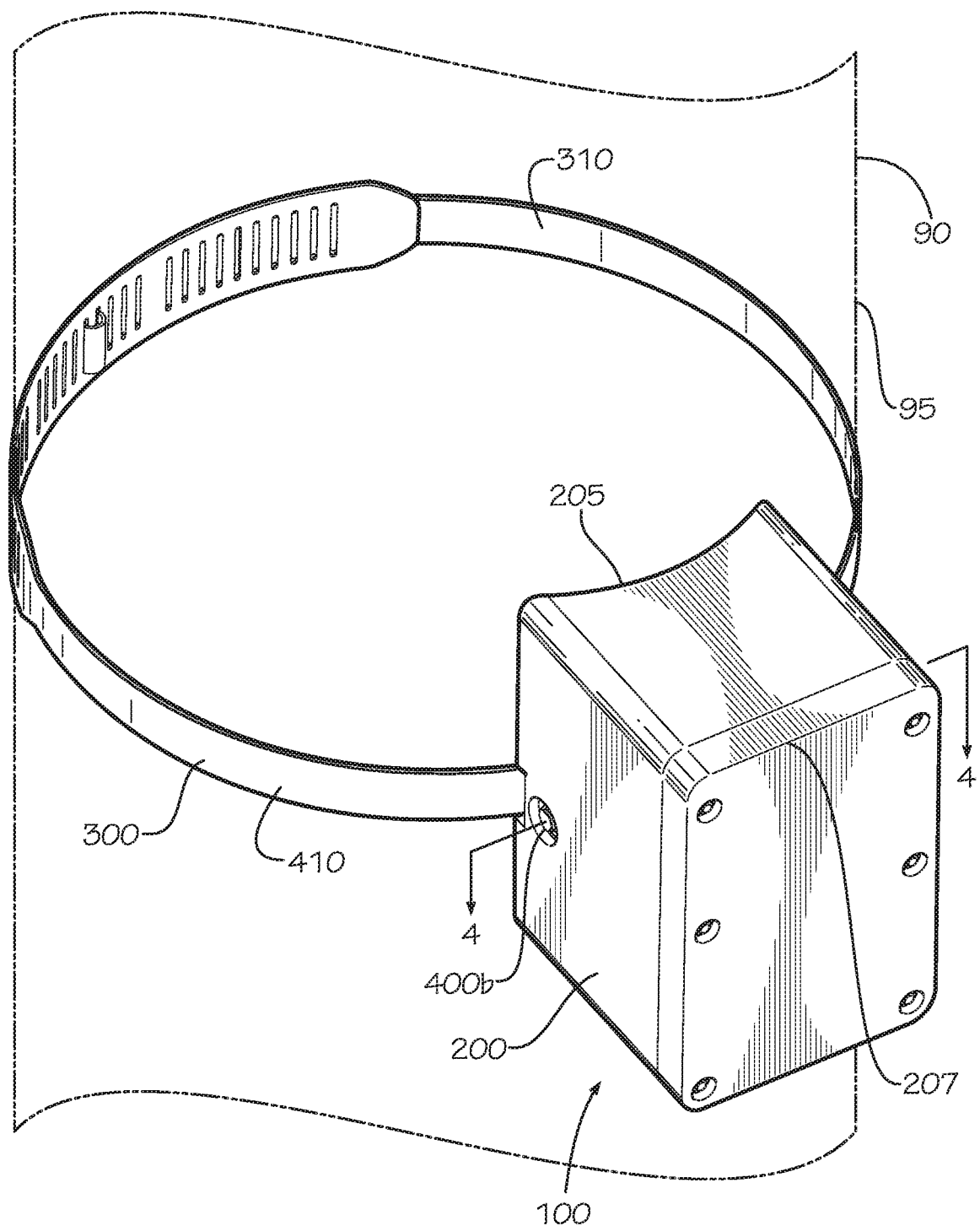
FIG. 1 is front perspective view of a leak detector comprising a housing and a strap assembly in accordance with one aspect of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the one aspect of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a fastener" can include two or more such fasteners unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a monitoring device and associated methods, systems, devices, and various apparatuses are described herein. The monitoring device can be mounted on a pipe system and can comprise a housing and a strap assembly. In one aspect, the monitoring device disclosed herein is, for example and without limitation, a leak detector configured to mount on the pipe system and sense acoustic energy signals traveling therein.

Various materials can be used to fabricate the various components of the monitoring device. The disclosure of the specific materials or finishes or types of materials or finishes listed, however, is not intended to be limiting on the current disclosure. One of ordinary skill in the art would know to substitute equivalent materials where appropriate.

Figure 2:
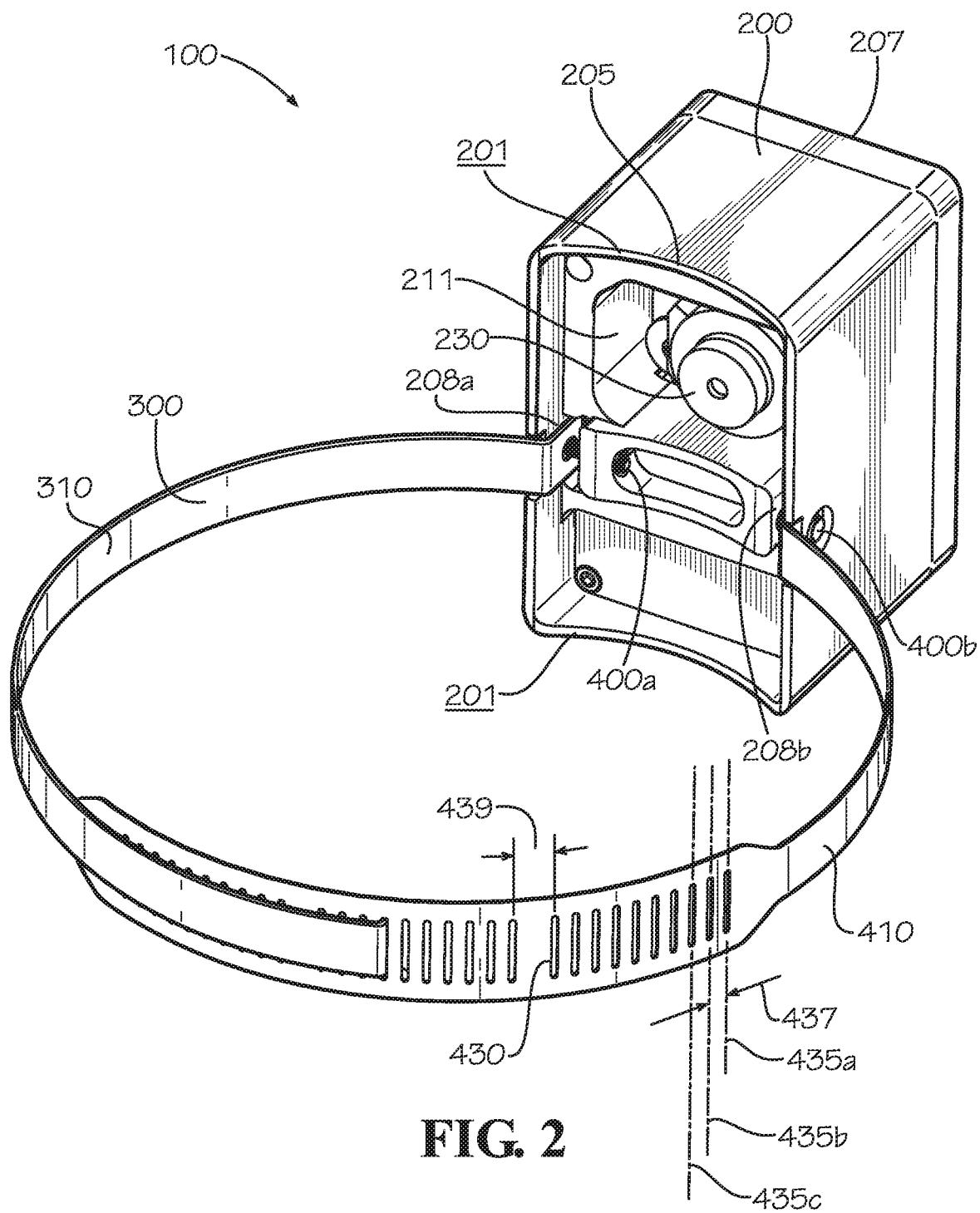
FIG. 2 is a rear perspective view of the leak detector of FIG. 1.

In one aspect, as shown in FIGS. 1 and 2, a monitoring device 100 for a pipe system 90 comprises a housing 200 and a strap assembly 300, which can also be described as a band. Each of one or more housing fasteners 400a,b (400a shown in FIG. 2), which can each be a tamper-resistant fastener, secures the strap assembly 300 to the housing 200. The housing 200 defines a mounting surface 201 (shown in FIG. 2) and a pair of mounting receptacles 208a,b on a mounting side 205 that is opposite to a distal side 207, the housing 200 configured to mount on an exterior surface of a pipe element 95 of the pipe system 90. The housing fastener 400a,b can be received within each mounting receptacle 208a,b to secure the strap assembly 300 to the housing 200. In one aspect, the strap assembly 300 comprises a first strap 310 and a second strap 410. As shown, the strap assembly 300 forms a circular shape in an assembled state. The circular shape can be pre-formed into the first strap 310 or the second strap 410 and can be formed during the assembly and installation processes. In other aspects, the strap assembly 300 can have a non-circular shape such as, for example and without limitation, that of a rectangle or that of another polygon (e.g., a hexagon or a octagon) or can be otherwise made to fit around a pipe element 95 having a non-circular shape. Optionally, the strap assembly 300 can be composed of a single strap or can be composed of more than two straps. A "pipe element" such as the pipe element 95 can include, for example and without limitation, pipes, valves, meters, fittings, or any other piping structure such as in a pipe system to which a monitoring device such as the monitoring device 100 can be attached.

The monitoring device 100 can be, for example and without limitation, a leak detector as shown. The monitoring device 100 can comprise a sensor 230 (shown in FIG. 2) enclosed in the housing 200. In one aspect, the sensor 230 is configured to mount on the exterior surface of the pipe element 95 of the pipe system 90. In one aspect, the pipe system 90 comprises a hydrant, the exterior surface of pipe element 95 of the pipe system 90 being an exterior surface of the hydrant, the mounting surface 201 shaped to match the exterior surface of the hydrant. As shown, the mounting surface 201 has a concave shape to match the convex exterior surface of the pipe element 95, although in other aspects the mounting surface 201 can have a flat shape to match a pipe element having a flat exterior surface or the mounting surface 201 can have a different shape.

Figure 3:
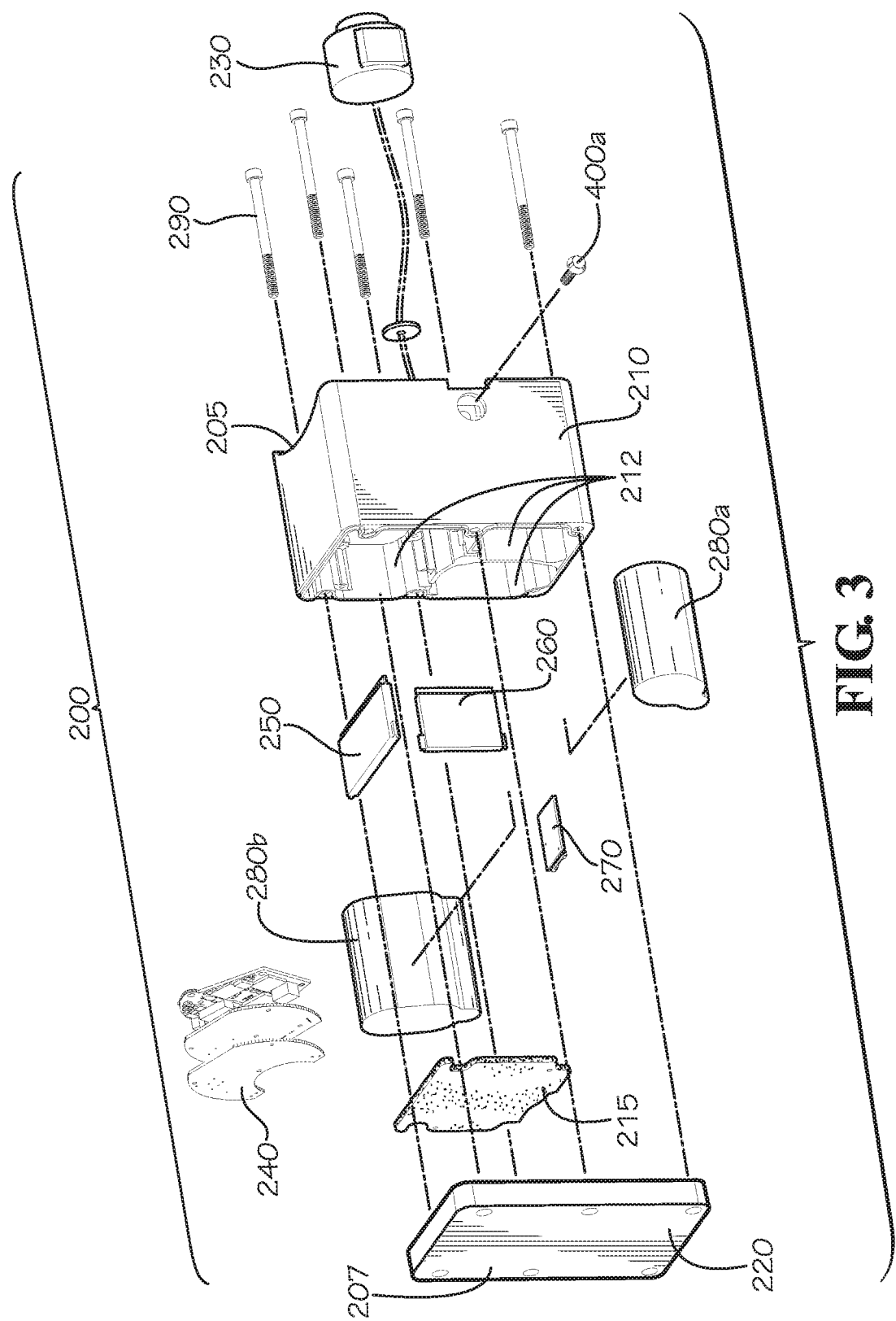
FIG. 3 is an exploded view of the housing of FIG. 1.

In one aspect, as shown in FIG. 3, the housing 200 comprises a body 210, a gasket 215, and a cover 220. The housing can additionally comprise a controller 240—which can comprise a printed circuit board ("PCB") assembly (shown in a partially exploded state in FIG. 3), a locating device 250 such as a GPS antenna, a communications device 260 such as an LTE cellular antenna, a data card 270 such as a SIM card, a data card holder 275 (shown in FIG. 4), and batteries 280a,b. As shown in FIG. 3, a plurality of fasteners 290 can be used to assemble the components of the housing 200 in such a way that the housing 200 cannot be disassembled without first removing the housing 200 from the strap assembly 300, removing or loosening the monitoring device 100 from the pipe element 95 to which it is secured, or damaging one or more components of the monitoring device 100. As shown, the head of each of the plurality of fasteners 290 is accessible only from the mounting side 205 of the housing 200 and are thus not accessible when the monitoring device 100 is installed as shown in FIG. 1 with the mounting surface 201 of the housing 200 contacting the pipe element 95. The cover 220 can comprise a plurality of threaded inserts (not shown) into which the plurality of fasteners 290 can tighten and which can only be removed by damaging the cover 220. The batteries 280a,b can be, for example and without limitation, direct-current batteries, and any number of batteries can be present, including zero, one, or more than two batteries.

In one aspect, the body 210 and the cover 220 define a wet compartment 211 (shown in FIG. 2) and a dry compartment 212. The wet compartment 211 defines an enclosure and is sized to receive the sensor 230. The dry compartment 212 defines an enclosure and is sized to receive the controller 240, the locating device 250, the communications device 260, the data card 270, and the batteries 280a,b. Optionally, the dry compartment 212 is sealably isolated from the wet compartment 211 with a potting material. Optionally, the sensor 230 is waterproof. Optionally, the gasket 215 is positioned between the body 210 and the cover 220 and facilitates a tight seal between the body 210 and the cover 220. The gasket 215 may define holes (not shown) to provide clearance for fasteners. The gasket 215 can be made from a rubber such as, for example and without limitation, Buna-N rubber (i.e., nitrile), ethylene propylene diene monomer (EPDM) rubber, or silicone. The gasket 215 can also be made of any other rubber, plastic, cork, wood, metal, ceramic, polymer, elastomer, rosin, foam, silicone, any combination of the foregoing materials, or any material suitable for sealing the joint between the body 210 and the cover 220.

While wiring and other details are not shown in FIG. 3, various components of the housing 200 are connected via physical wires or when installed inside the body 210 are brought into either wired or wireless communication with other components of the housing 200. As shown, the monitoring device 100 communicates wirelessly with the monitoring system of which it is part.

Figure 4:
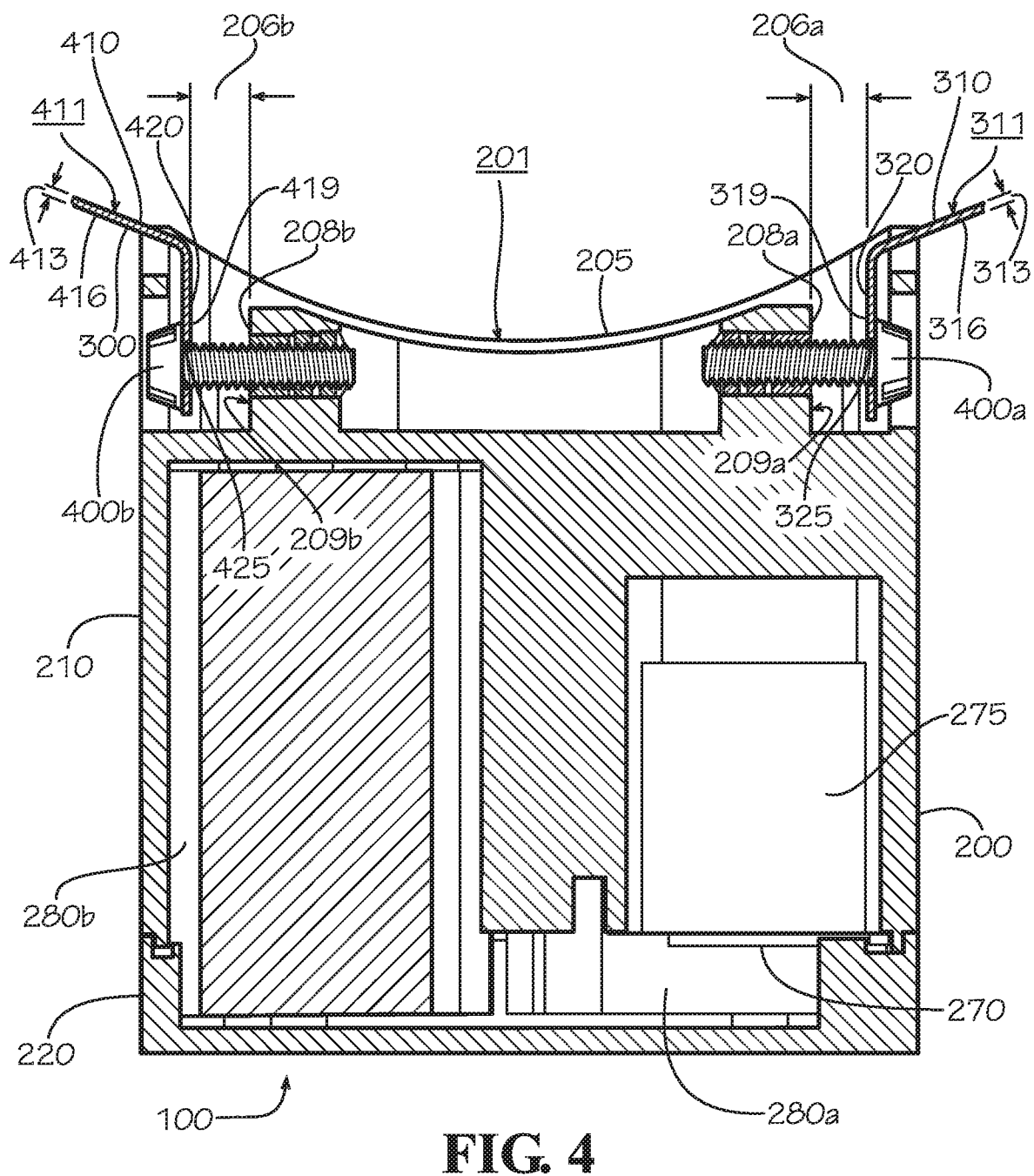
FIG. 4 is a sectional view of the housing of FIG. 2 taken along line 4-4 of FIG. 1.
Figure 5:
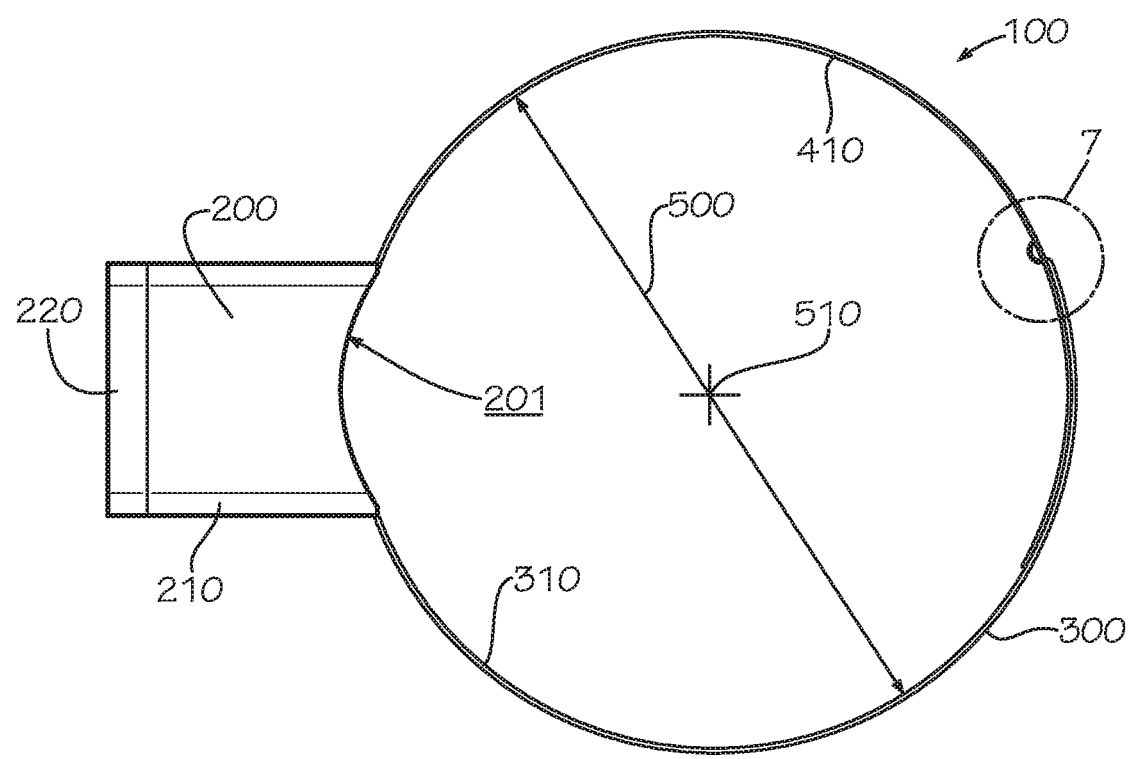
FIG. 5 is a top view of the leak detector of FIG. 1.

In one aspect, as shown in FIGS. 4 and 5, the housing 200 comprises the mounting receptacles 208a,b. The housing fastener 400a is shown connecting a first mounting tab 320 within the first mounting receptacle 208a of the pair of mounting receptacles 208a,b, and a second mounting tab 420 is shown coupled to the second mounting receptacle 208b of the pair of mounting receptacles 208a,b, optionally by the housing fastener 400b. In another aspect, the second mounting tab 420 can be lockably coupled to the second mounting receptacle 208b without a separate housing fastener 400b. For example and without limitation, the second mounting tab 420 can be lockably coupled to the second mounting receptacle 208b by forming the second mounting tab 420 into a barbed connection that can easily enter the second mounting receptacle 208b but not easily exit the second mounting receptacle 208b. In such a connection, the second mounting tab 420 is not removable without damaging the second mounting tab 420 or the second mounting receptacle 208b.

The mounting surface 201 is concave in shape but can be of any shape to match, as desired, the pipe element 95 to which the housing 200 is assembled. Optionally, the first mounting tab 320 of the first strap 310 defines a mounting hole 325 through which the housing fastener 400a extends, and the second mounting tab 420 of the second strap 410 defines a mounting hole 425 through which the housing fastener 400b extends. Each of the mounting holes 325, 425 can elongated, circular, or have a key-hole shape which accommodates a head 401 (shown in FIG. 15) on a larger end and a threaded portion 402 (shown in FIG. 15) on a smaller end. As shown, each of the housing fasteners 400a,b adjustably secures the strap assembly 300 to the housing 200. Specifically, a tab portion 319 of an inner surface 311 of the first strap 310 at the first mounting tab 320 and a facing surface 209a of the first mounting receptacle 208a of the housing 200 can define an adjustment distance 206a. Likewise, a tab portion 419 of an inner surface 411 of the second strap 410 at the second mounting tab 420 and a facing surface 209b of the second mounting receptacle 208b of the housing 200 can define an adjustment distance 206b. Each of the adjustment distances 206a,b are gaps that allow the strap assembly 300 to be adjustably secured to the housing 200 by further loosening or tightening of the respective housing fasteners 400a,b. The adjustment distances 206a,b allow for fine adjustment of an inner diameter 500 (shown in FIG. 5) of the strap assembly 300 during the final steps of installation of the monitoring device 100. For example and without limitation, each of the adjustment distances 206a,b can be about 0.080 inches (2.0 millimeters). In another aspect, however, each of the adjustment distances 206a,b can be less than or greater than this value.

Figure 6:
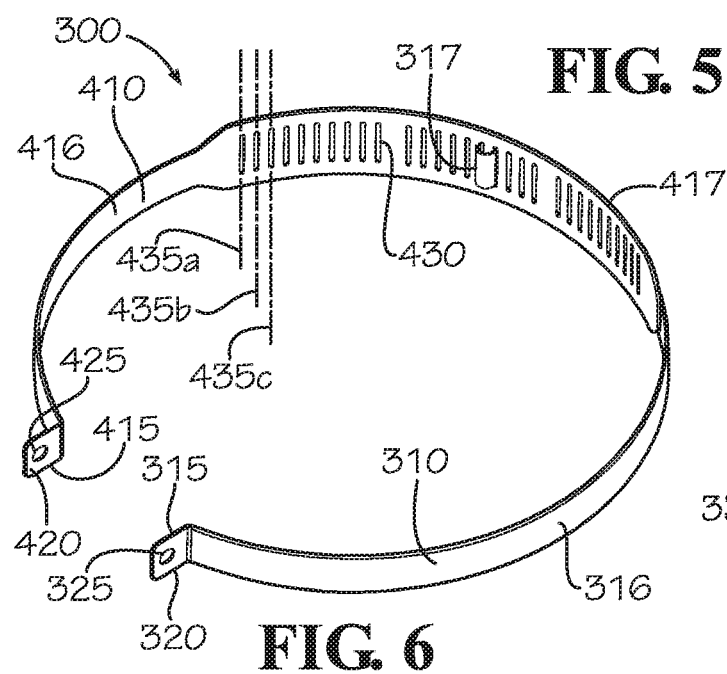
FIG. 6 is a top front perspective view of the strap assembly of FIG. 1.
Figure 7:
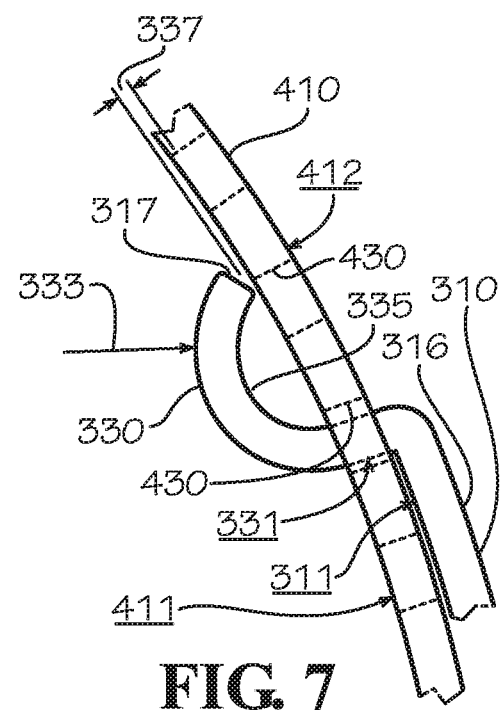
FIG. 7 is a detail view of the strap assembly of FIG. 6 taken from detail 7 of FIG. 5.

FIGS. 5-7 show one variation of the strap assembly 300. As shown in FIG. 6, the first strap 310 comprises a first mounting end 315, a first adjusting end 317 distally located from the first mounting end 315, and a first intermediate portion 316 therebetween. The first strap 310 comprises the first mounting tab 320 proximate to the first mounting end 315 and an insert tab 330 (shown in FIG. 7) proximate to the first adjusting end 317. Also shown in FIG. 6, the second strap 410 comprises a second mounting end 415, a second adjusting end 417 distally located from the second mounting end 415, and a second intermediate portion 416 therebetween. The second strap 410 comprises the second mounting tab 420 proximate to the second mounting end 415. One or more edges of the first strap 310 or the second strap 410 at the respective adjusting ends 317, 417 or at a transition between the adjusting ends 317, 417 and the intermediate portions 316, 416 can comprise a chamfer or a radius.

As shown in FIG. 6, the second strap 410 defines a plurality of adjustment slots 430 proximate to the second adjusting end 417. Each adjustment slot 430 is aligned in an axial direction along an axis 510 of the strap assembly and sized to lockably receive a portion of the insert tab 330 in any one of a plurality of insert positions 435 such as insert positions 435a,b,c. The portion of the insert tab 330 is lockably received in the adjustment slot 430 when the portion is inserted into the adjustment slot 430 and positioned such that the portion cannot be removed from the adjustment slot 430 without significantly repositioning the first strap 310 and the second strap 410 relative to each other or damaging one or both of the first strap 310 and the second strap 410. Each adjustment slot 430 has a length in an axial direction that is slightly longer than a width in an axial direction of the insert tab 330 of the first strap 310. For example and without limitation, each adjustment slot 430 has a width in a circumferential direction of 0.074 inches (1.9 millimeters). Thus each insert position 435 corresponds to a different inner diameter 500 (shown in FIG. 5) of the strap assembly 300 when the monitoring device 100 is tightened. Insert positions 435 may be individually separated by a pitch 437 (shown in FIG. 2) and may be separated by a separation distance 439 (shown in FIG. 2) into groups of slots (for example and without limitation, groups of ten slots each) to ease identification of a particular insert position 435. The pitch 437 and the separation distance 439 need not be constant around the circumference of the second strap 410. The number of insert positions 435 is limited only by the length of the second strap 410 and the spacing between each insert position 435. As shown, a portion of the first strap 310 proximate to the first adjusting end 317 crosses a portion of the second strap 410 proximate to the second adjusting end 417, and a portion of the first strap 310 is positioned radially inside the second adjusting end 417 of the second strap 410 relative to the axis 510. When the monitoring device 100 is tightened, the insert tab 330 is lockably coupled to the second strap 410 and cannot be removed without loosening the monitoring device 100.

As shown in FIG. 7, the insert tab 330 of the first strap 310 has a semicircular-shaped locking portion 335 defining a radiused portion 333 and has been inserted into one of the adjustment slots 430 of the second strap 410 through an outer surface 412 of the second strap 410. In its final assembled position relative the second strap 410, the inner surface 311 of a portion of the first strap 310 is substantially facing an outer surface 412 of the second strap 410 such that a portion of the first strap 310 rests along and radially outside the second strap 410 relative to the axis 510. Because the insert tab 330 is hooked through one of the plurality of adjustment slots 430, tensile forces on the ends of the strap assembly 300 that would otherwise separate the first strap 310 from the second strap 410 cause only a locking surface 331 of the insert tab 330 to bear against a side of the adjustment slot 430 in which the insert tab 330 is inserted. The insert tab 330 can be formed such that in an assembled state a gap 337 exists between the first adjusting end 317 of the first strap 310 and the inner surface 411 of the second strap 410. Optionally, the pitch 437 (shown in FIG. 2) can be set such that a portion of the first adjusting end 317 of the first strap 310 extends through an adjustment slot 430 when the strap assembly 300 is assembled around the pipe element 95 of the pipe system 90.

Figure 8:
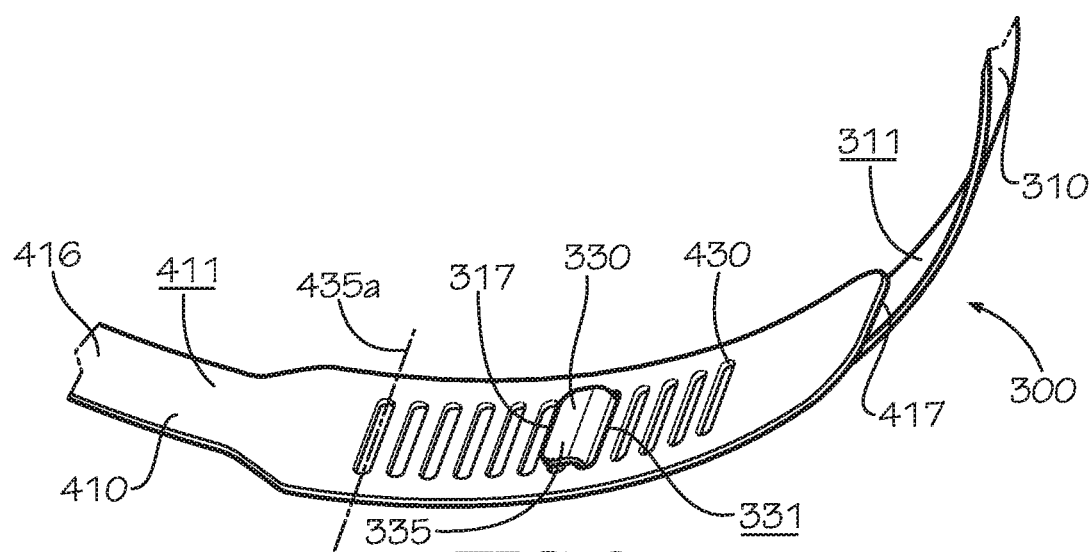
FIG. 8 is a bottom front perspective view of a portion of a strap assembly in accordance with another aspect of the current disclosure.
Figure 9:
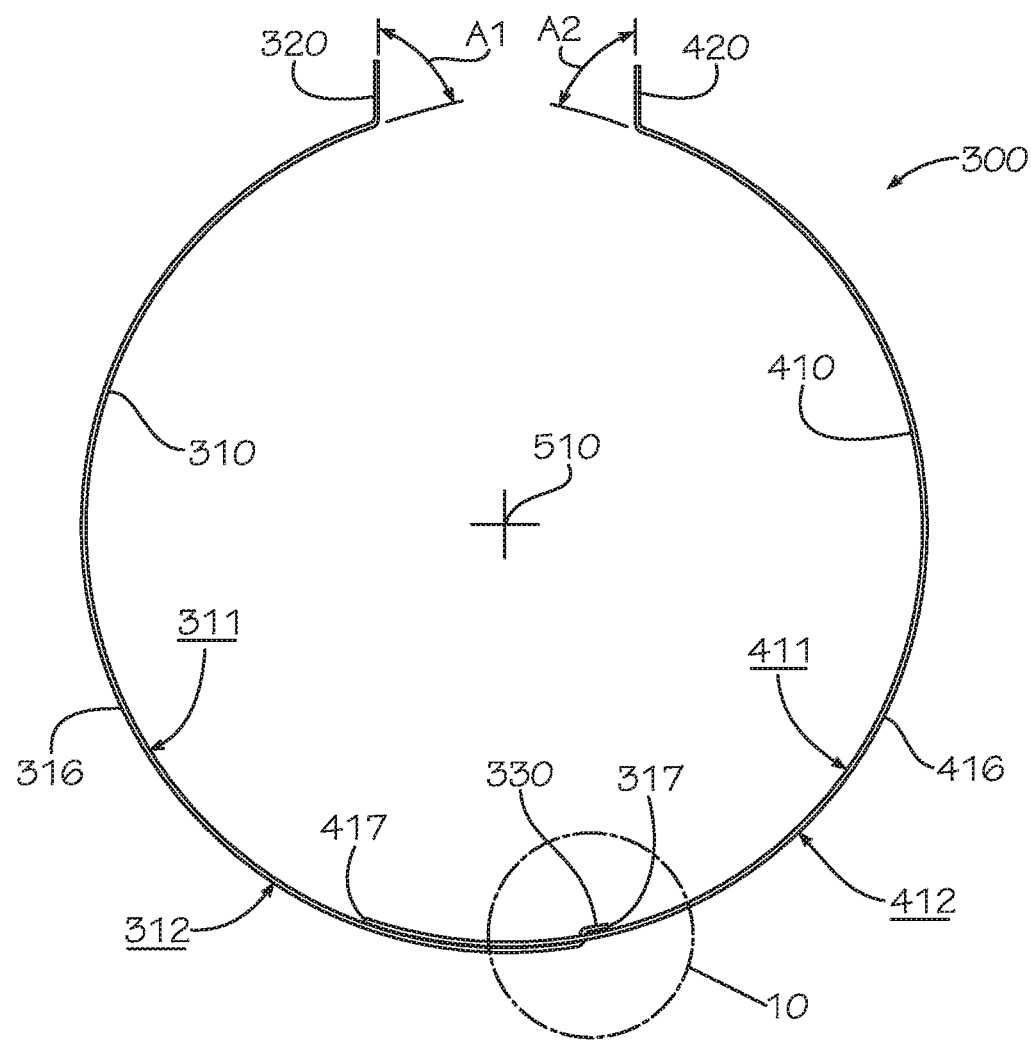
FIG. 9 is a top view of the strap assembly of FIG. 8.
Figure 10:
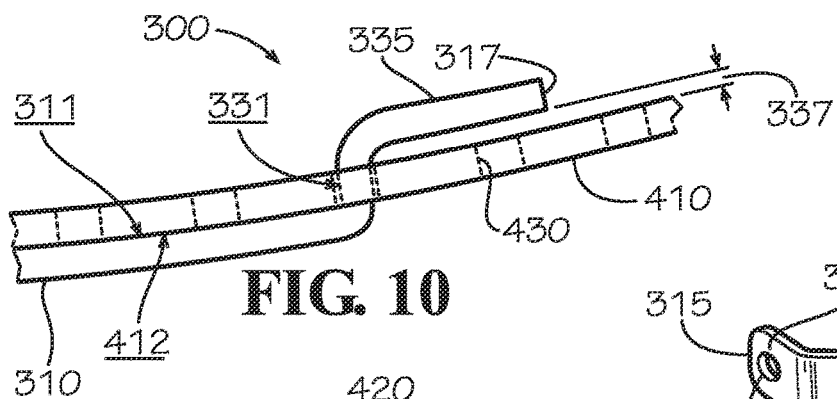
FIG. 10 is a detail view of the strap assembly of FIG. 8 taken from detail 10 of FIG. 9.

FIGS. 8-10 show another variation of the strap assembly 300. As shown in FIG. 8, the insert tab 330 is L-shaped and has a flat locking portion 335 inserted into one of the adjustment slots 430 of the second strap 410. As shown in FIG. 9, the first mounting tab 320 is angled with respect to a portion of the first intermediate portion 316 adjacent to the first mounting tab 320 by an angle A1, and the second mounting tab 420 is angled with respect to a portion of the second intermediate portion 416 adjacent to the second mounting tab 420 by an angle A2. The first mounting tab 320 and the second mounting tab 420 are parallel so that they can be inserted into the respective first mounting receptacle 208a and the second mounting receptacle 208b. As shown in FIG. 10, tensile forces on the ends of the strap assembly 300 cause the locking surface 331 of the insert tab 330 to again bear against a side of the adjustment slot 430 in which the insert tab 330 is assembled.

Figure 11:
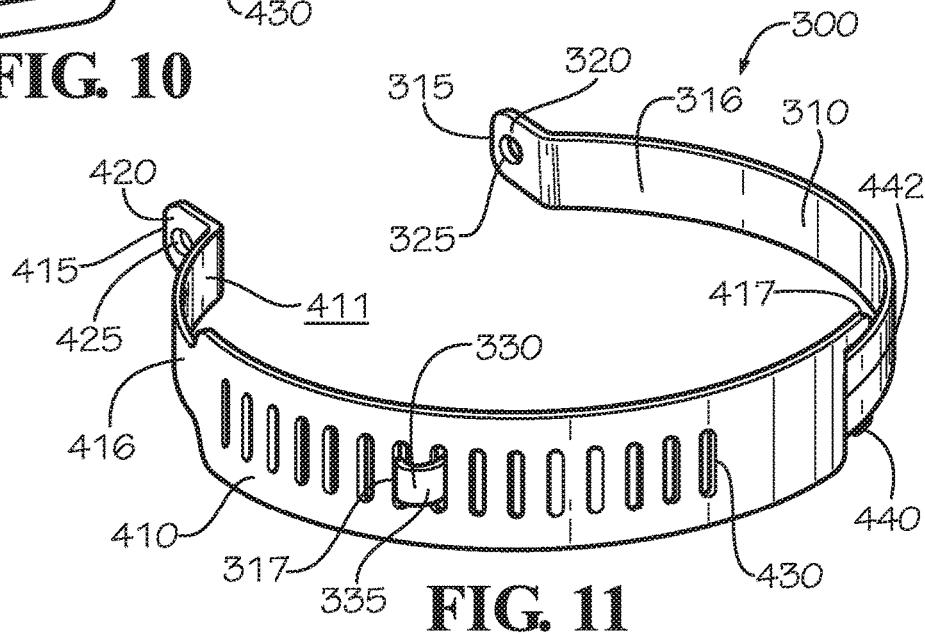
FIG. 11 is a top rear perspective view of a strap assembly in accordance with another aspect of the current disclosure.
Figure 12:
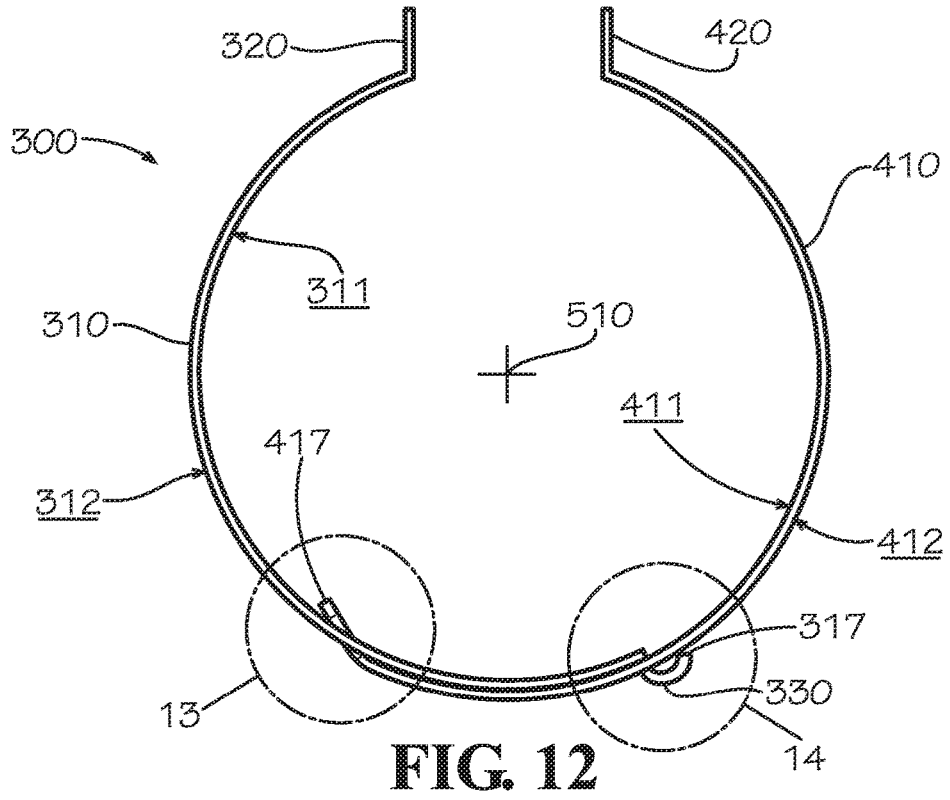
FIG. 12 is a bottom view of the strap assembly of FIG. 11.
Figure 13:
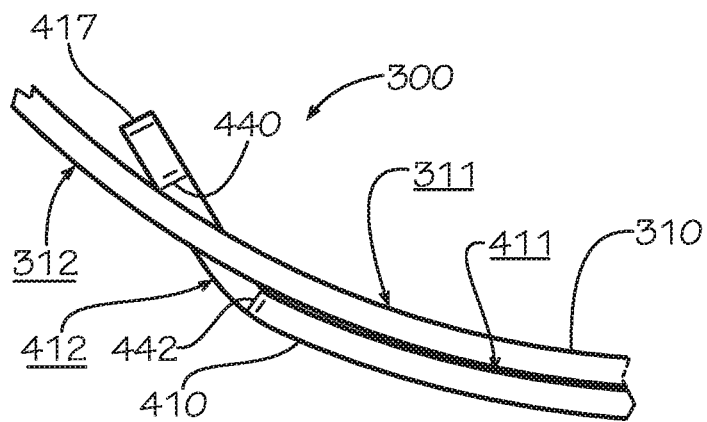
FIG. 13 is a detail view of the strap assembly of FIG. 12 taken from detail 13 of FIG. 12.
Figure 14:
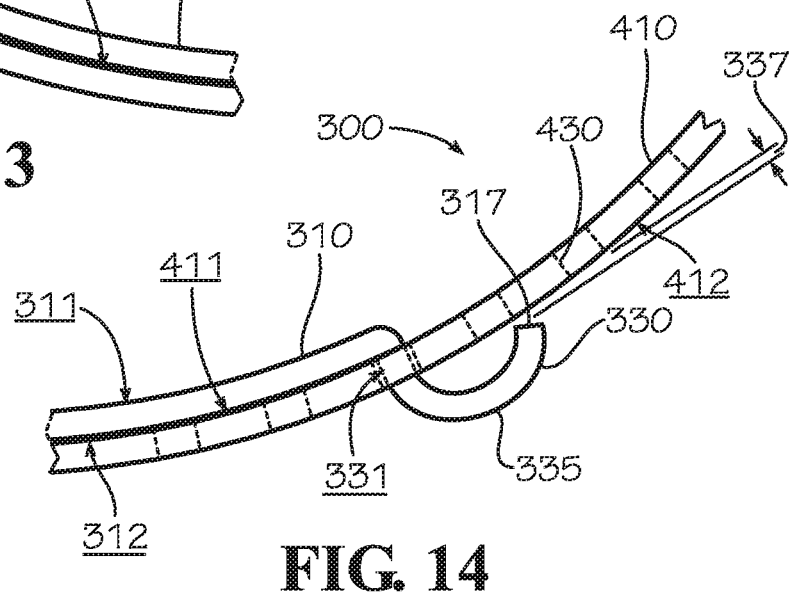
FIG. 14 is a detail view of the strap assembly of FIG. 12 taken from detail 14 of FIG. 12.

FIGS. 11-14 show another variation of the strap assembly 300. As shown in FIG. 11, the insert tab 330 has a semicircular-shaped locking portion 335 inserted into one of the adjustment slots 430 of the second strap 410 through the inner surface 411 of the second strap 410. Additionally, a locking clip 440 is formed into the second strap 410 proximate to the second adjustment end 417. The locking clip 440 is made to cross and lockably couple with the narrower first strap 310. Such engagement of the locking clip 440 with the first strap 310 is possible with sufficient looseness of the insert tab 330 within the adjustment slot 430 into which it is inserted. For example and without limitation, the locking clip 440 of the second strap 410 defines a slot 442 that is sized to lockably receive a portion the first strap 310. In its final assembled position relative the second strap 410, the outer surface 312 of a portion of the first strap 310 is substantially facing an inner surface 411 of the second strap 410 such that a portion of the first strap 310 rests along and radially inside the second strap 410 relative to the axis 510. As shown in FIG. 14, tensile forces on the ends of the strap assembly 300 cause the locking surface 331 of the insert tab 330 to again bear against a side of the adjustment slot 430 in which the insert tab 330 is assembled.

In one aspect, each of the first adjusting end 317, the second adjusting end 417, the first intermediate portion 316, and the second intermediate portion 416 has an axial length measured in an axial direction along the axis 510 of the strap assembly 300. A first axial length of the first adjusting end 317 is greater than a first strap thickness 313 (shown in FIG. 4) of the first adjusting end 317 and a second axial length of the second adjusting end 417 is greater than a second strap thickness 413 (shown in FIG. 4) of the second adjusting end 417. In another aspect, the first axial length or the second axial length is less than or equal to the first strap thickness 313 and the second strap thickness 413, respectively. As shown in each variation of the strap assembly 300, each of the adjustment slots 430 of the second strap 410 are aligned in an axial direction along the axis 510 of the strap assembly 300.

Figure 15:
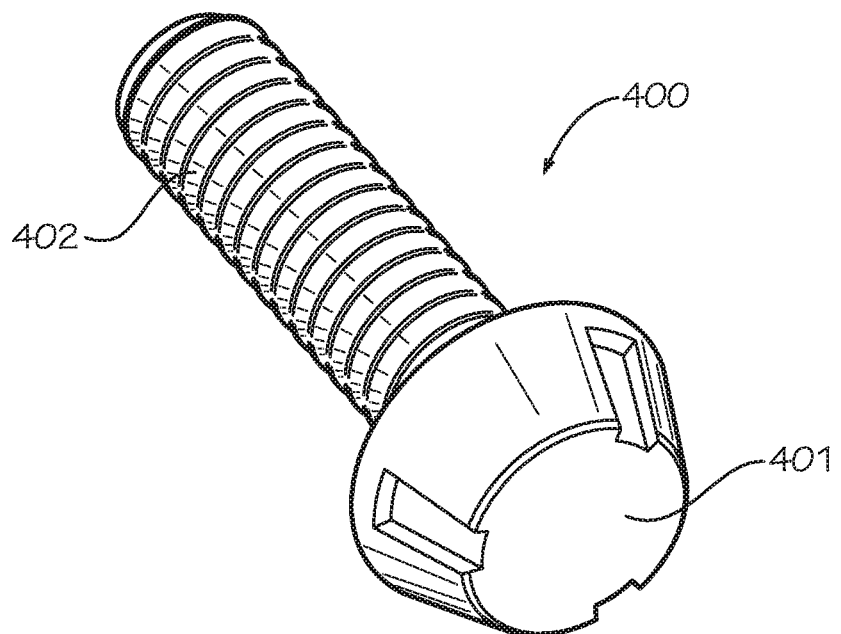
FIG. 15 is a perspective view of a tamper-proof housing fastener of the housing of FIG. 1 in accordance with one aspect of the current disclosure.

In one aspect, as shown in FIG. 15, the housing fastener 400, which comprises the head 401 and the threaded portion 402, is a tamper-resistant fastener and thus resists unfastening without a special removal tool. Fasteners that are tamper-resistant include, for example and without limitation, Pin in Torx fasteners, Pin in Hex fasteners, Drilled Spanner fasteners, One Way fasteners, Philips Pin-Head fasteners, High-Security Drive fasteners including an irregular or custom shape, Tri-Groove fasteners, TRI WING fasteners, and TP3 triangular recessed-drive fasteners. A fastener such as the housing fastener 400, including both tamper-resistant and non-tamper-resistant versions can comprise, for example and without limitation, clockwise threads or counterclockwise threads (such as an OPSIT reverse-thread fastener) and can have full threads or partial threads, with or without a shoulder. The housing fastener 400, including both tamper-resistant and non-tamper-resistant versions, can have, for example and without limitation, a truss head, a pan head, a round head, a button head, a flat head, or a countersunk head. A tamper-resistant fastener can also be described as a tamper-proof fastener or a security fastener. The fastener shown in FIG. 15 is a Tri-Groove tamper-proof fastener with full threads, no shoulder, and a button head.

Figure 17:
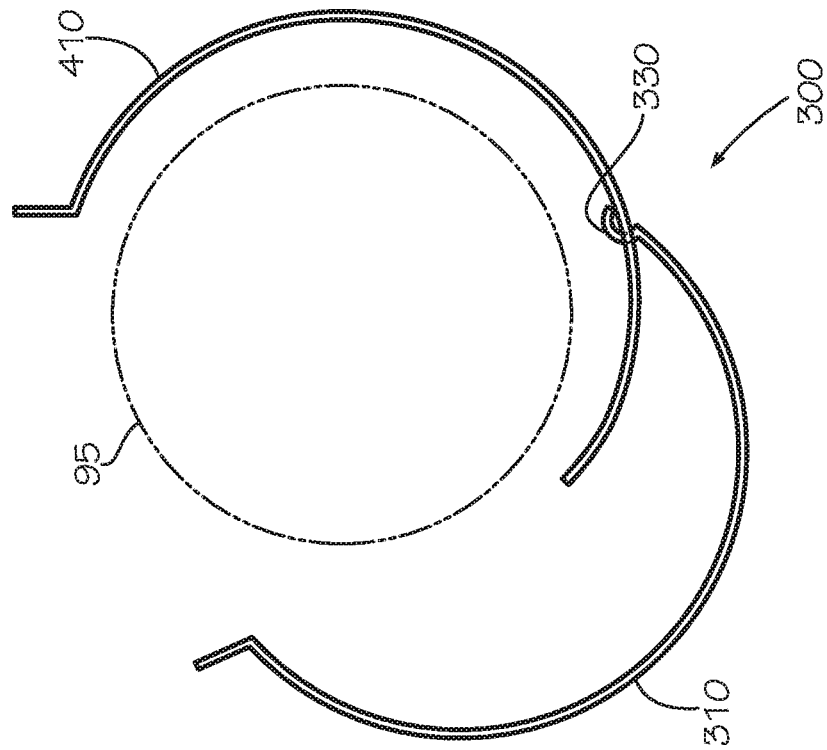
FIG. 17 is a top view of a strap assembly of the leak detector of FIG. 1 in a second position during installation of the leak detector.
Figure 16:
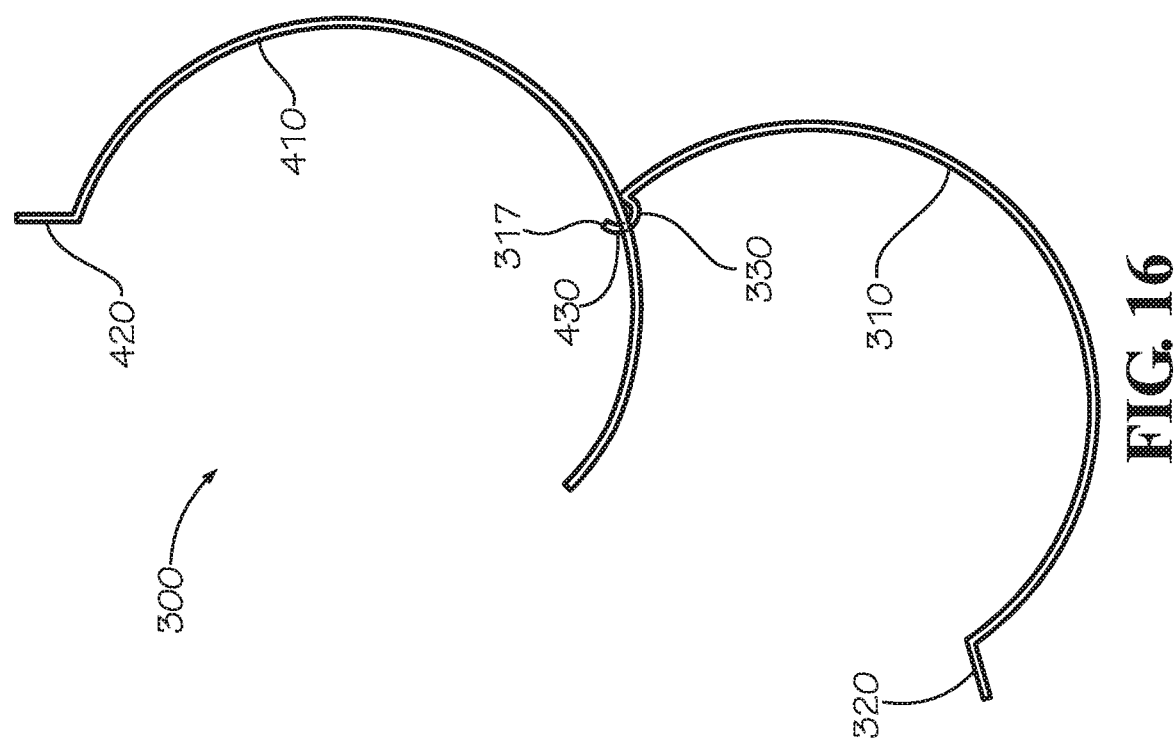
FIG. 16 is a top view of a strap assembly of the leak detector of FIG. 1 in a first position during installation of the leak detector about a pipe element of a pipe system in accordance with one aspect of the current disclosure.
Figure 18:
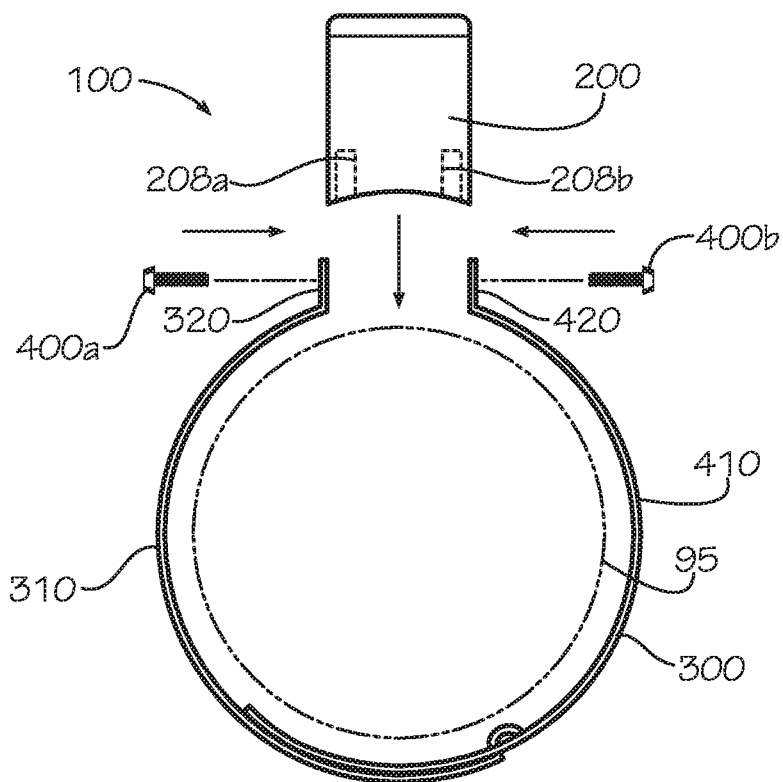
FIG. 18 is a top view of a strap assembly of the leak detector of FIG. 1 in a third position during installation of the leak detector.

In one aspect, as shown in FIG. 16, a method for installing the monitoring device 100 on the pipe system 90 comprises coupling the first adjusting end 317 of the first strap 310 of the strap assembly 300 to the second strap 410 of the strap assembly 300 by inserting the insert tab 330 of the first strap 310 into a one of the plurality of adjustment slots 430 defined on the second strap 410, each of the plurality of adjustment slots 430 sized to lockably receive a portion of the insert tab 330 in any one of a plurality of insert positions 435. As shown in FIG. 17, the method additionally comprises substantially encircling the exterior surface of the pipe element 95 of the pipe system 90 with the strap assembly 300 by rotating the first strap 310 relative to the second strap 420 about the insert position 435. As shown in FIG. 18, the method additionally comprises coupling the housing 200 to the strap assembly 300 by installing the housing fastener 400a through the first mounting tab 320 of the first strap 310 of the strap assembly 300 and into the mounting receptacle 208a of the housing 200. The method additionally comprises coupling the housing 200 to the strap assembly 300 by installing the housing fastener 400b through the second mounting tab 420 of the second strap 410 of the strap assembly 300 and into the mounting receptacle 208b of the housing 200. The gaps between the pipe element 95 and the strap assembly 300 are shown exaggerated in FIG. 18.

Figure 19:
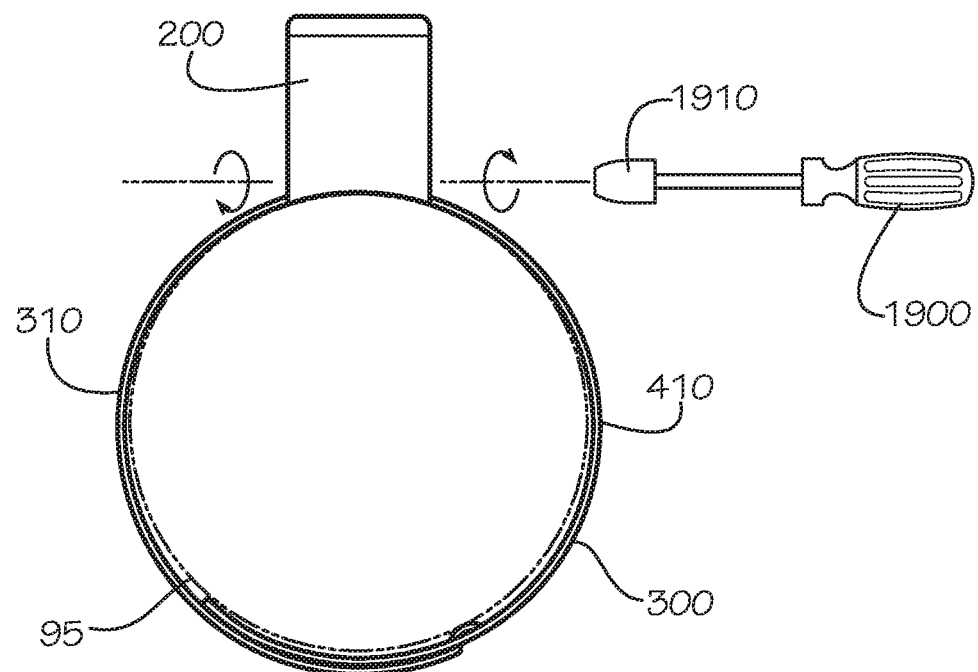
FIG. 19 is a top view of a strap assembly of the leak detector of FIG. 1 in a fourth position during installation of the leak detector.

As shown in FIG. 19, the method comprises tightening the strap assembly 300 against an exterior surface of the pipe element 95 of the pipe system 90 by tightening one or more of the housing fasteners 400a,b as shown with a tightening tool 1900 having a bit 1910 matching the head of the housing fasteners 400a,b. In the case of certain types of tamper-proof fasteners other than the housing fastener 400 shown in FIG. 15, removing the housing fastener 400a,b requires a tool other than the tightening tool 1900 with the bit 1910 (i.e., by drilling out the fastener as in the case of a One Way tamper-proof fastener). The method can further comprise tightening the housing fastener 400a,b from a fully engaged first position to a fully engaged second position by reducing the adjustment distances 206a,b, bringing the respective mounting tabs 320, 420 towards each other and thereby reducing the inner diameter 500 of the strap assembly 300. In one aspect, as shown in FIG. 4, the housing fastener 400a,b is fully engaged when it extends inside the housing 200 a sufficient distance to secure the housing fastener 400a,b in place relative to the housing 200, even if the housing fastener 400a,b can be further tightened. Optionally, the method further comprises mounting the monitoring device 100 to a hydrant such as a fire hydrant, the exterior surface of the pipe system 90 being an exterior surface of the hydrant.

The method can further comprise mounting the sensor 230 to the exterior surface of the pipe element 95 of the pipe system 90 with an adhesive material such as a metal-filled epoxy before encircling the exterior surface of the pipe element 95 of the pipe system 90 with the strap assembly 300. In one aspect, metal fragments in the epoxy will facilitate the transmission of acoustic energy signals such as vibrations in the pipe system 90 to the sensor 230. In another aspect, an epoxy not containing metal fragments or another adhesive may be used. During the mounting process, the sensor 230 will typically be brought as close to the exterior surface of the pipe element 95 as possible to minimize the gap between the exterior surface of the pipe element 95 and the sensor 230. The thickness of the adhesive material used can vary to fill in the gap between the exterior surface of the pipe element 95 and the sensor 230 and will typically be only as thick as required to bridge the gap. After mounting the sensor 230 to the pipe element 95, the housing 200 is placed over the sensor 230. In another aspect, the sensor 230 can be mounted to the pipe element 95 as the housing 200 is itself simultaneously mounted to the pipe element 95. In such an aspect, the sensor can be held in position relative to the housing 200 by the housing 200 and a compressible gasket material or a spring or the body 210 of the housing 200 can be used to hold the sensor 230 tight against the exterior surface of the pipe element 95. The sensor 230 can be already wired to the housing 200 or configured to connect to the housing 200 after mounting of the sensor 230. As previously discussed, the sensor 230 can be configured to sense acoustic energy signals traveling inside the pipe system 90.

In one aspect, as shown in FIG. 18, coupling the housing 200 to the strap assembly 300 is performed after coupling the first strap 310 of the strap assembly 300 to the second strap 410 of the strap assembly 300. Coupling the housing 200 to both the first strap 310 and the second strap 410 of the strap assembly 300 after coupling the first strap 310 to the second strap 410 makes it more difficult to disengage the first strap 310 from the second strap 410 and therefore makes the monitoring device 100 more resistant to tampering. Once the housing 200 is coupled to both the first strap 310 and the second strap 410, disengaging the first strap 310 from the second strap 410 becomes more difficult because rotating the first strap 310 relative to the second strap 410 to remove the insert tab 330 from the insert position 435 is not typically possible without cutting or otherwise damaging the first strap 310, the second strap 410, or the housing 200. In another aspect, the housing 200 can be first coupled to a one of the first strap 310 and the second strap 410 but not both the first strap 310 and the second strap 410 before coupling the first strap 310 to the second strap 410. In subsequent steps, the first strap 310 can be coupled to the second strap 410 and then the housing 200 can be coupled to the one of the first strap 310 and the second strap 410 to which the housing 200 is not already coupled. In one aspect, the monitoring device 100 is removed from the pipe element 95 of the pipe system 90 only by a one of damaging a portion of the monitoring device 100 and uninstalling a one of the first housing fastener 400a and the second housing fastener 400b.

Components of the pipe system 90 including the pipe element 95 can be made from, for example and without limitation, a metal such as ductile iron or another cast iron, steel, or a non-metallic materials such as polyvinyl chloride (PVC). The body 210 and the cover 220 can be made from, for example and without limitation, fiber-reinforced plastic.

The first strap 310 and the second strap 410 of the strap assembly 300 can be made from, for example and without limitation, a metal such as steel, copper, or bronze; a non-metallic material such as a polyamide plastic or a polypropylene plastic; or a variety of other non-elastomeric materials. For example and without limitation, each of the first strap 310 and the second strap 410 can be formed from an AISI 304 L series stainless steel having a thickness of 0.040 inches (1.0 millimeters).

The components of the strap assembly 300 can be formed from a flat blank of raw material using one or more material removal processes such as, for example and without limitation, machining, stamping, punching, laser-cutting, abrasive-water-jet-cutting, and chemical milling or etching. Optionally, such a material removal process can be used in combination with forming processes such as, for example and without limitation, casting, forging, stamping, bending, and three-dimensional printing.

For example and without limitation, each of the housing fasteners 400 can be tightened until the strap assembly 300 and the mounting side of the housing 200 are snug (i.e., held flush) against the exterior surface of the pipe element 95 of the pipe system 90. Optionally, each of the housing fasteners 400 can be additionally tightened past this point. None of the housing fasteners 400, however, is typically tightened so much that the strap assembly 300 or the housing 200 is damaged.

As a leak detector, the sensor 230 of the monitoring device 100 can be configured to sense acoustic energy signals traveling in the pipe system 90 which would indicate that fluid is traveling through the pipe system 90 even when it should not or when fluid is escaping the pipe system, such as in a pipe burst situation. Such monitoring can be performed by a monitoring system such as the Mi.Echo system available from Mueller Systems. The monitoring device 100 can also be used to monitor the condition of walls of a pipe system 90, can monitor whether the pipe system 90 has been tampered with, can monitor temperature, or can monitor characteristics of fluid flow within the pipe system 90 in order to identify transient effects such as pressure surges and water hammer.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A monitoring device for a pipe system, the monitoring device comprising:
   a housing defining a mounting surface and a pair of mounting receptacles on a mounting side, the housing configured to mount on an exterior surface of a pipe element of the pipe system, the housing comprising:
      a housing body defining a wet compartment intersecting the mounting surface and a dry compartment separate from the wet compartment and sealed from water intrusion through a wall of the housing body; and a housing cover removably securable to the housing body, the dry compartment and the housing cover being sized to receive and enclose electrical components of the monitoring device;

a tamper-resistant housing fastener configured to resist unfastening without a special removal tool; and a strap assembly comprising a mounting tab, the strap assembly secured to the housing by receiving the housing fastener through the mounting tab and within a first mounting receptacle of the pair of mounting receptacles.

2. The monitoring device of claim 1, further comprising a sensor, the sensor being a leak detector, the wet compartment being sized to receive the sensor.

3. The monitoring device of claim 1, wherein the dry compartment is sealed from water intrusion through the wall of the housing body.

4. The monitoring device of claim 3, further comprising the electrical components.

5. The monitoring device of claim 3, wherein the electrical components comprise a controller, a communications device, and a battery.

6. The monitoring device of claim 3, wherein the dry compartment is sealably isolated from an environment surrounding the housing body.

7. The monitoring device of claim 1, wherein the mounting surface is concave in shape.

8. The monitoring device of claim 1, wherein the housing fastener is exposed by the housing body, the strap assembly able to be disassembled only using the special removal tool when the mounting surface of the housing body is mounted on the exterior surface of the pipe element.

9. The monitoring device of claim 1, wherein the strap assembly further comprises a first strap and a second strap and wherein:

the first strap comprises a first mounting end, a first adjusting end distally located from the first mounting end, and an intermediate portion therebetween, wherein the first strap further comprises a first mounting tab proximate to the first mounting end and an insert tab proximate to the first adjusting end, wherein the first mounting tab is coupled to a first mounting receptacle of the pair of mounting receptacles; and the second strap comprises a second mounting end, a second adjusting end distally located from the second mounting end, and a second intermediate portion therebetween, wherein the second strap further comprises a second mounting tab proximate to the second mounting end and the second mounting tab coupled to a second mounting receptacle of the pair of mounting receptacles, wherein the second strap defines a plurality of adjustment slots proximate to the second adjusting end, wherein each adjustment slot is aligned in an axial direction of the strap assembly and sized to lockably receive a portion of the insert tab in any one of a plurality of insert positions, wherein each insert position corresponds to a different inner diameter of the strap assembly when the housing fastener is tightened, wherein a portion of the first strap proximate to the first adjusting end crosses a portion of the second strap proximate to the second adjusting end, and wherein a portion of the first strap is positioned radially inside the second adjusting end of the second strap, the insert tab lockably coupled to the second strap when the housing fastener is tightened.

10. The monitoring device of claim 9, wherein the insert tab comprises one of a semicircular-shaped locking portion and an L-shaped flat locking portion, the insert tab inserted into one of the adjustment slots.

11. The monitoring device of claim 9, wherein a tip of the insert tab extends outward through an adjustment slot adjacent to the adjustment slot through which the insert tab is inserted.

12. A housing assembly for a monitoring device for a pipe system, the assembly comprising:

a housing body defining a mounting surface and a pair of mounting receptacles on a mounting side, the housing body configured to mount on an exterior surface of a pipe element of the pipe system, the housing defining a wet compartment intersecting the mounting surface;

a housing cover;

a cover fastener securing the housing cover to the housing body; and a strap assembly secured to the housing with a tamper-resistant housing fastener, the tamper-resistant housing fastener configured to resist unfastening without a special removal tool.

13. The housing assembly of claim 12, further defining a dry compartment separate from the wet compartment and sealed from water intrusion through a wall of the housing body.

14. The housing assembly of claim 13, wherein the dry compartment is sized to receive a controller, a communications device, and a battery.

15. The housing assembly of claim 13, wherein the dry compartment is sealably isolated from an environment surrounding the housing assembly.

16. The housing assembly of claim 12, wherein the mounting surface is concave in shape.

17. The housing assembly of claim 12, wherein the cover fastener is configured to prevent disassembly of the housing cover from the housing body without first removing the housing fastener when the mounting surface of the housing body is mounted on the exterior surface of the pipe element.

18. The housing assembly of claim 12, wherein the strap assembly further comprises a first strap and a second strap and wherein:

the strap assembly comprises a first mounting tab and a second mounting tab;

the first strap comprises a first mounting end, a first adjusting end distally located from the first mounting end, and an intermediate portion therebetween, wherein the first strap further comprises the first mounting tab proximate to the first mounting end and an insert tab proximate to the first adjusting end, wherein the first mounting tab is coupled to a first mounting receptacle of the pair of mounting receptacles; and the second strap comprises a second mounting end, a second adjusting end distally located from the second mounting end, and a second intermediate portion therebetween, wherein the second strap further comprises the second mounting tab proximate to the second mounting end and the second mounting tab coupled to a second mounting receptacle of the pair of mounting receptacles, wherein the second strap defines a plurality of adjustment slots proximate to the second adjusting end, wherein each adjustment slot is aligned in an axial direction of the strap assembly and sized to lockably receive a portion of the insert tab in any one of a plurality of insert positions, wherein each insert position corresponds to a different inner diameter of the strap assembly when the housing fastener is tightened, wherein a portion of the first strap proximate to the first adjusting end crosses a portion of the second strap proximate to the second adjusting end, and wherein a portion of the first strap is positioned radially inside the second adjusting end of the second strap, the insert tab lockably coupled to the second strap when the housing fastener is tightened.

19. The housing assembly of claim 18, wherein the insert tab comprises one of a semicircular-shaped locking portion and an L-shaped flat locking portion, the insert tab inserted into one of the adjustment slots.

20. The housing assembly of claim 18, wherein the housing fastener is exposed by the housing body, the strap assembly able to be disassembled only using the special removal tool when the mounting surface of the housing body is mounted on the exterior surface of the pipe element.

21. The housing assembly of claim 18, wherein a tip of the insert tab extends outward through an adjustment slot adjacent to an adjustment slot through which the insert tab is inserted.

\* \* \* \* \*